United States Patent [19]
Galgana

[11] Patent Number: 4,711,050
[45] Date of Patent: Dec. 8, 1987

[54] LOBSTER POT

[75] Inventor: Thomas C. Galgana, Quincy, Mass.

[73] Assignee: Wilfred Norris, Plymouth, Mass.

[21] Appl. No.: 849,022

[22] Filed: Apr. 7, 1986

[51] Int. Cl.$^4$ ............................................. A01K 71/00
[52] U.S. Cl. ...................................................... 43/102
[58] Field of Search ................ 43/100, 102, 103, 104, 43/105, 65

[56] References Cited

U.S. PATENT DOCUMENTS

| | | | |
|---|---|---|---|
| 3,678,612 | 4/1972 | Hendricksen | 43/100 |
| 3,826,032 | 7/1974 | Tarngren | 43/100 |
| 3,992,804 | 11/1976 | Senese | 43/103 |
| 4,221,070 | 9/1980 | Swindell | 43/100 |

Primary Examiner—Nicholas P. Godici
Assistant Examiner—G. Reid

[57] ABSTRACT

The invention disclosed herein comprises a lobster pot having plastic, unitary heads. The lobster pot may also be have its frame partially or completely formed of plastic and its sides may be formed of wire mesh.

6 Claims, 9 Drawing Figures

LOBSTER POT

BACKGROUND OF THE INVENTION

This invention relates generally to a lobster pots and more specifically to lobster pots having unitary plastic heads.

SUMMARY OF THE INVENTION

The invention disclosed herein comprises a lobster pot having unitary plastic heads.

Variations of the invention discloses a lobster pot having a frame formed completely or partially of plastic and having a grooved method of engaging wire side pieces.

BRIEF DESCRIPTION OF THE DRAWINGS

Further details are explained below with the help of the examples illustrated in the attached drawings in which.

DESCRIPTION OF THE PREFERRED EMBODIMENT(S)

Figure 1:
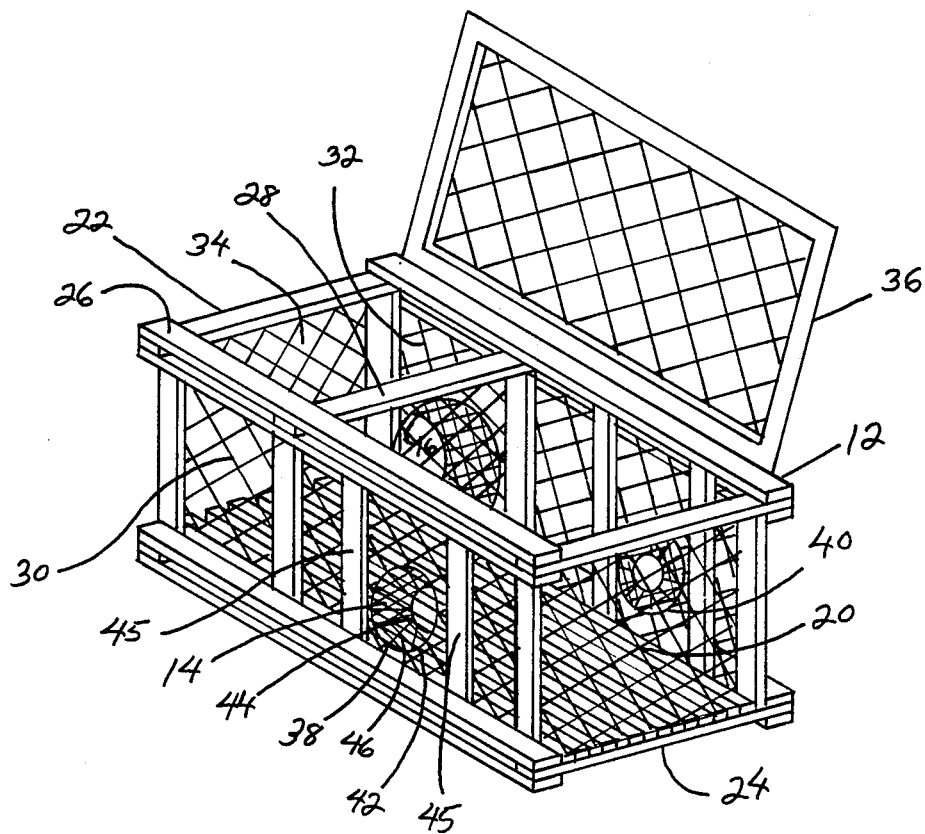
FIG. 1 is an perspective view of the lobster pot according to the present invention.
Figure 2:
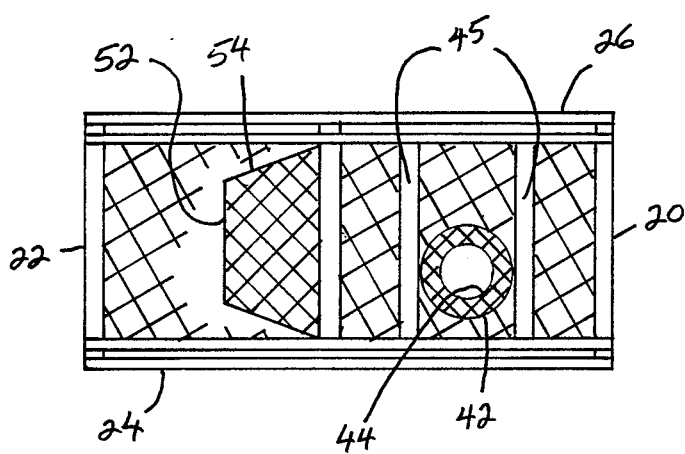
FIG. 2 is a side elevational view of the lobster pot shown in FIG. 1.
Figure 3:
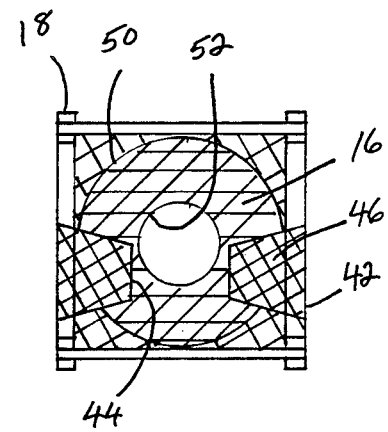
FIG. 3 is an end elevational view of the lobster pot shown in FIG. 1.

There is shown in the drawings a lobster pot 10 including a housing 12, a pair of kitchen heads 14, and a parlor head 16.

The housing 12 is generally rectangular in configuration and includes a frame formed of wooden laths 18 which are covered with cord netting in the conventional manner. Obviously the housing 12 can be constructed in other configurations, if desired. The housing 12 comprises a first end side 20, a second end side 22, a base side 24, a top side 26, a middle frame member 28, a first long side 30 and a second long side 32. The top side 26 has a rectangular opening 34 formed therein which is defined by wooden laths attached to the housing frame. A door member 36, formed of a frame of wooden laths having a cord netting covering covers the opening 34. The door member 36 is hingedly attached to the top side 26 and the opening 34 is positioned on the top side 26 so that it is superimposed over the parlor and kitchen areas. The parlor area is the area between the middle frame member 28 and the second end side 22. The kitchen area is the area between the middle frame member 28 and the first end side 20. A first entry opening 38 is formed in the first long side 30 at the kitchen area. A second entry opening 40 is formed in the second long side 32 at the kitchen area opposite the first entry opening 38 and in spaced relation thereto.

Each of the kitchen heads 14 is generally frustoconical in configuration, is unitary, is made of a plastic material and includes a circular entry collar 42, a circular exit collar 44 and a side 46. The side 46 may be reticulated or may include a number of spaced, through apertures of any desired size and shape but not large enough to permit the passage of a grown lobster therethrough. The entry collar 42 defines the entrance into the housing 12 and defines a larger diameter than the exit collar 44. A wooden lath member 45 is attached to the first long side 30 at right angles to the length of the first long side 30 on each side of the first entry opening 38, as shown in FIG. 1. The same construction is provided on the second long side 32 in relation to the second entry opening 40. A kitchen head 14 is attached to first long side 30 by nailing or otherwise attaching the entry collar 42 to the inside surfaces of the lath members 45 surrounding first entry opening 38. The kitchen head 14 extends into the kitchen area with the exit defined by the exit collar 44 within the kitchen area and the circular exit, entry and first entry opening in coaxial relationship. No further attachment is required. The other kitchen head 14 is attached to second long side 32 by nailing or otherwise attaching the entry collar 42 to the inside surfaces of the latch members 45 surrounding second entry opening 40. The kitchen head 14 extends into the kitchen area with the exit defined by the exit collar 44 within the kitchen area and the circular exit, entry and first entry opening in coaxial relationship. The entry collar may be rectangular.

The parlor head 16 is generally frustoconical in configuration, is unitary, is made of a plastic material and includes a circular entrance collar 50, a circular egress collar 52 and a side portion 54. The side portion 54 may be reticulated or may include a number of spaced through apertures of any desired size and shape but not large enough to permit the passage of a grown lobster therethrough. The entrance collar 50 defines the entrance into the parlor and defines a larger diameter than the egress collar 52. The parlor head 16 is attached to the middle frame member 28 by nailing or otherwise attaching the entrance collar 50 to the inside surfaces of the middle frame member 28. The parlor head 16 extends into the parlor area with the exit into the parlor area defined by the egress collar 52 within the parlor area and the circular entrance collar 50 and egress collar 52 and the rectangular opening defined by the middle frame member 28 in "coaxial" relationship. No further attachment is required. The lobster pot 10 may now be used in the manner well known in the art. Replacement of the heads 14, 16 is extremely simple, due to the unitary construction and the ease of attachment.

A variation of the lobster pot 10 is shown in FIGS. 4–7 numbered as 10a and includes a housing 12a, a pair of kitchen heads 14a, and a parlor head 16a.

Figure 4:
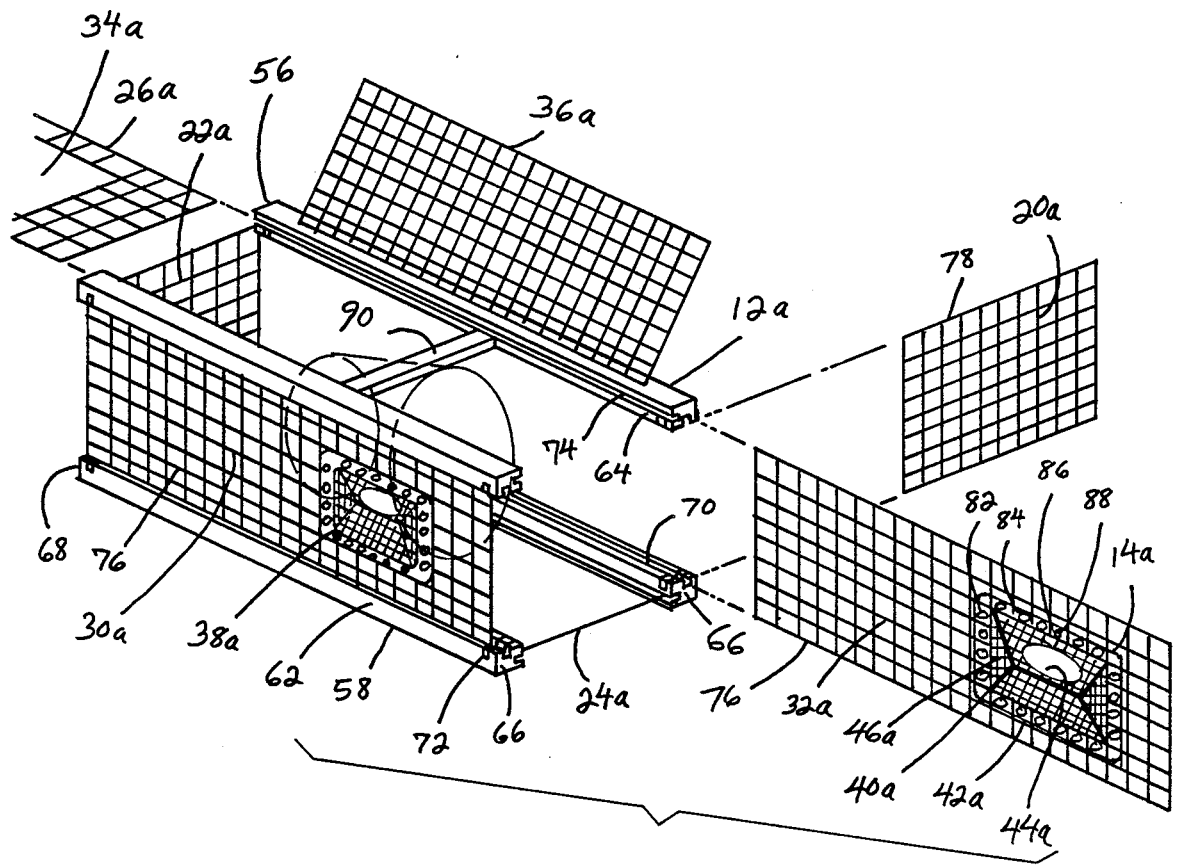
FIG. 4 is an exploded view of a variation of the lobster pot shown in FIG. 1.
Figure 5:
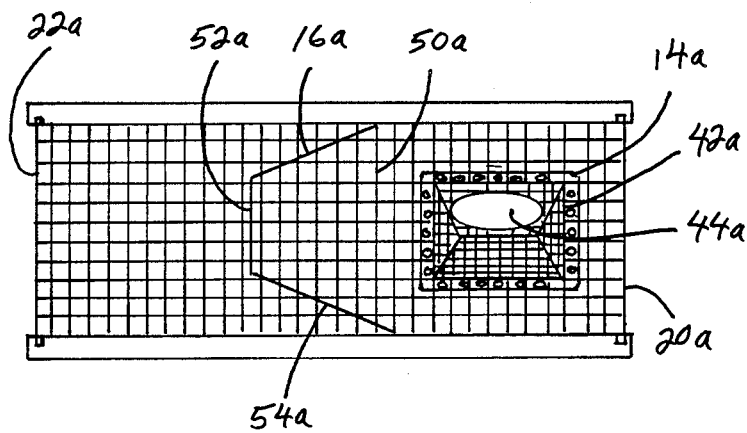
FIG. 5 is a side elevational view of the lobster pot shown in FIG. 4.
Figure 6:
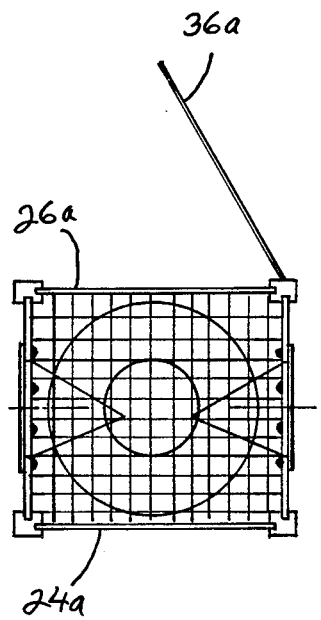
FIG. 6 is a end elevational view of the lobster pot shown in FIG. 4.

The housing 12a is generally rectangular in configuration as was the housing 12 and includes a frame formed of wooden or plastic latch members providing a pair of top channel members 56, bottom channel members 58 and a series of sections of wire mesh formed of fuse-bonded PVC-coated wire. Each of the channel members 56, 58 is configured as a rectangular strip having a first support face 62 formed on one long side, a second support face 64 formed on another long side in right angle relation to the first long side as shown in FIG. 4 and having a first terminal end 66 and a second terminal end 68. Each of the first support faces 62 has a centrally positioned side mesh support channel 70 formed therein extending from the first terminal end 66 to the second terminal end 68. Each of the terminal ends 66, 68 has a cross channel 72 formed in spaced parallel relation to the face of the terminal end 66, 68 and traversing in right angle relationship the side mesh support channel 70. Each of the second support races 64 has a centrally positioned second mesh support channel 74 formed therein extending from the cross channel 72 of the the first terminal end 66 to the cross channel 72 of the second terminal end 68. Each of the sections 76 of wire mesh is generally rectangular in configuration having long edges 78 and short edges 80. It is important to note that the cross section configuration of each of the channels 70, 72 and 74 is bottle shaped. That is, it includes a narrow neck portion which opens into a bulbous portion. Since the interconnection of the wire of the sections 76 of wire mesh form nodes which are of greater diameter than the narrow necks of the said channels but are of less diameter than the bulbous portion of the said channels and since the sections 76 are cut so that a line of nodes defines the edges of the sections 76, the engagement of a section 76 with a channel will position the nodes in the bulbous section and crosswires in the narrow necks.

Figure 7:
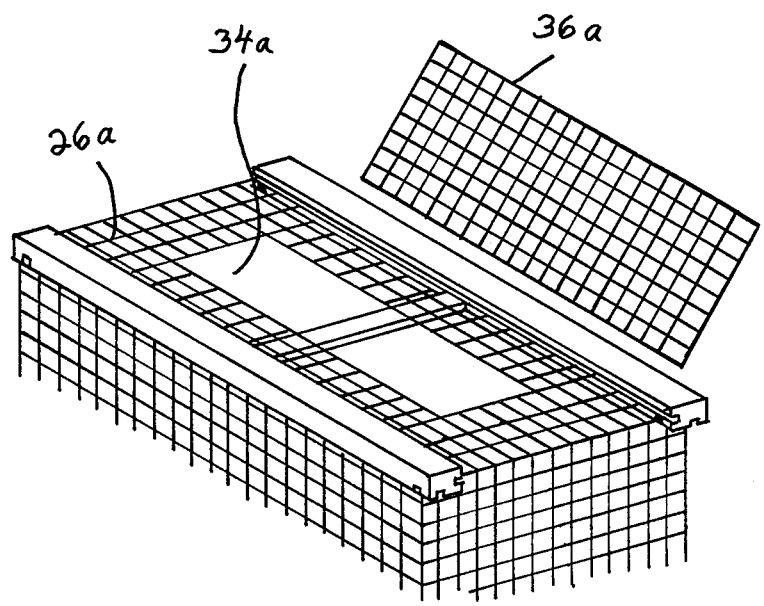
FIG. 7 is a perspective view of the lobster pot shown in FIG. 4 partially broken away.

The housing 12a is assembled in the following manner: first position one of the long edges 78 of a first section 76 of wire mesh within one of the second mesh support channels 76 of a top channel members 56 and positioning the other one of the long edges 78 of the said section 76 of wire mesh within the second mesh support channel 74 of the other top channel member 56 forming, for example, a top side 26a; secondly position one of the long edges 78 of a second section 76 of wire mesh within one of the second mesh support channels 74 of a bottom channel members 58 and positioning the other one of the long edges 78 of the said section 76 of wire mesh within the second mesh support channel 74 of the other bottom channel member 58 forming, for example, a base side 24a; the top side 26a is superimposed in spaced relation with the base side 24a; then position one of the long edges 78 of a third section 76 of wire mesh within one of the side mesh support channels 70 of a bottom channel members 58 and positioning the other one of the long edges 78 of the said section 76 of wire mesh within the side mesh support channel 70 of the top channel member 56 aligned with the bottom channel members 58; then position one of the long edges 78 of a fourth section 76 of wire mesh within the remaining side mesh support channels 70 of a bottom channel members 58 and positioning the other one of the long edges 78 of the said section 76 of wire mesh within the side mesh support channel 70 of the other top channel member 56 aligned with the bottom channel members 58; then position one of the long edges 78 of a fifth section 76 of wire mesh within the cross channels 72 of the bottom channel members 58 and positioning the other one of the long edges 78 of the said section 76 of wire mesh within the cross channels 72 of the top channel members 56 aligned with the bottom channel members 58 thereby providing a closed box configuration. The housing 12a now comprises a first end side 20a, a second end side 22a, a top side 26a a base side 24a, a first long side 30a and a second long side 32a. The top side 26a has a rectangular opening 34a formed therein as shown in FIG. 7. A door member 36a, formed of a frame of laths having a wire mesh covering covers the opening 34a. The door member 36a is hingedly attached to the top side 26a and the opening 34a is positioned on the top side 26a so that it is superimposed over the parlor and kitchen areas. The parlor area is the area between a center plane of the housing 12a and the second end side 22a. The kitchen area is the area between the center plane of the housing 12a and the first end side 20a. A rectangular first entry opening 38a is formed in the first long side 30a at the kitchen area. A rectangular second entry opening 40a is formed in the second long side 32a at the kitchen area opposite the first entry opening 38a and in spaced relation thereto.

Each of the kitchen heads 14a is generally frustoconical in configuration, is unitary, is made of a plastic material and includes a rectangular entry collar 42a, a circular exit collar 44a and a side 46a. The entry collar 42a has a series of spaced engagement studs 82 extending from the periphery thereof. Each of the engagement studs 82 comprises a shank portion and a conical head portion 84 integral with the free terminal end of the shank. The head portion 84 defines a first shoulder 86 positioned on one side of the shank and a second shoulder 88 positioned on the other side of the shank. The entry collar 42a defines the entrance into the housing 12a and defines a larger diameter than the exit collar 44a. A kitchen head 14a is attached to the wire mesh by axially aligning it with the first entry opening 38a so that, for example, the portion of the head portion 84 defining the first shoulder 86 will bear against wires of the wire mesh causing the head portion 84 and its integral shank to flex slightly away from that wire and engaging that wire against the first shoulder 86. There is another size of wire mesh wich will engage the second shoulder 88 in the same manner. The kitchen head 14a extends into the kitchen area with the exit defined by the exit collar 44a within the kitchen area and the circular exit, entry and first entry opening in coaxial relationship. No further attachment is required. The other kitchen head 14a is attached to second long side 32a in a similar manner. The kitchen head 14a extends into the kitchen area with the exit defined by the exit collar 44a within the kitchen area and the circular exit, entry and first entry opening in coaxial relationship.

The parlor head 16a is generally frustoconical in configuration, is unitary, is made of a plastic material and includes a rectangular entrance collar 50a, a circular egress collar 52a and a side portion 54a. The side portion 54a may be reticulated or may include a number of spaced, through apertures of any desired size and shape but not large enough to permit the passage of a grown lobster therethrough. The entrance collar 50a defines the entrance into the parlor and defines a larger diameter than the egress collar 52a. The parlor head 16a is attached to the wire mesh of the first and second long sides 30a, 32a at the center plane of the housing 12a by wiring the entrance collar 50a to the mesh of the first and second long sides 30a, 32a and the base side 24a as well as to a bar member 90. The bar member 90 is attached by adhesive or other appropriate fastening means to the top channel members 56 to lie on a plane below the top side 26a. The diameter of the entrance collar 50a is substancially equal to the area defined at the center plane of the housing 12a by the first and second long sides 30a, 32a, the base side 24a and the bar member 90. The parlor head 16a extends into the parlor area with the exit into the parlor area defined by the egress collar 52a within the parlor area and the circular entrance collar 50a and egress collar 52a in "coaxial"

relationship. No further attachment is required. The lobster pot 10a may know be used in the manner well known in the art. Replacement of the heads 14a, 16a is extremely simple, due to the unitary construction and the ease of attachment.

Figure 8:
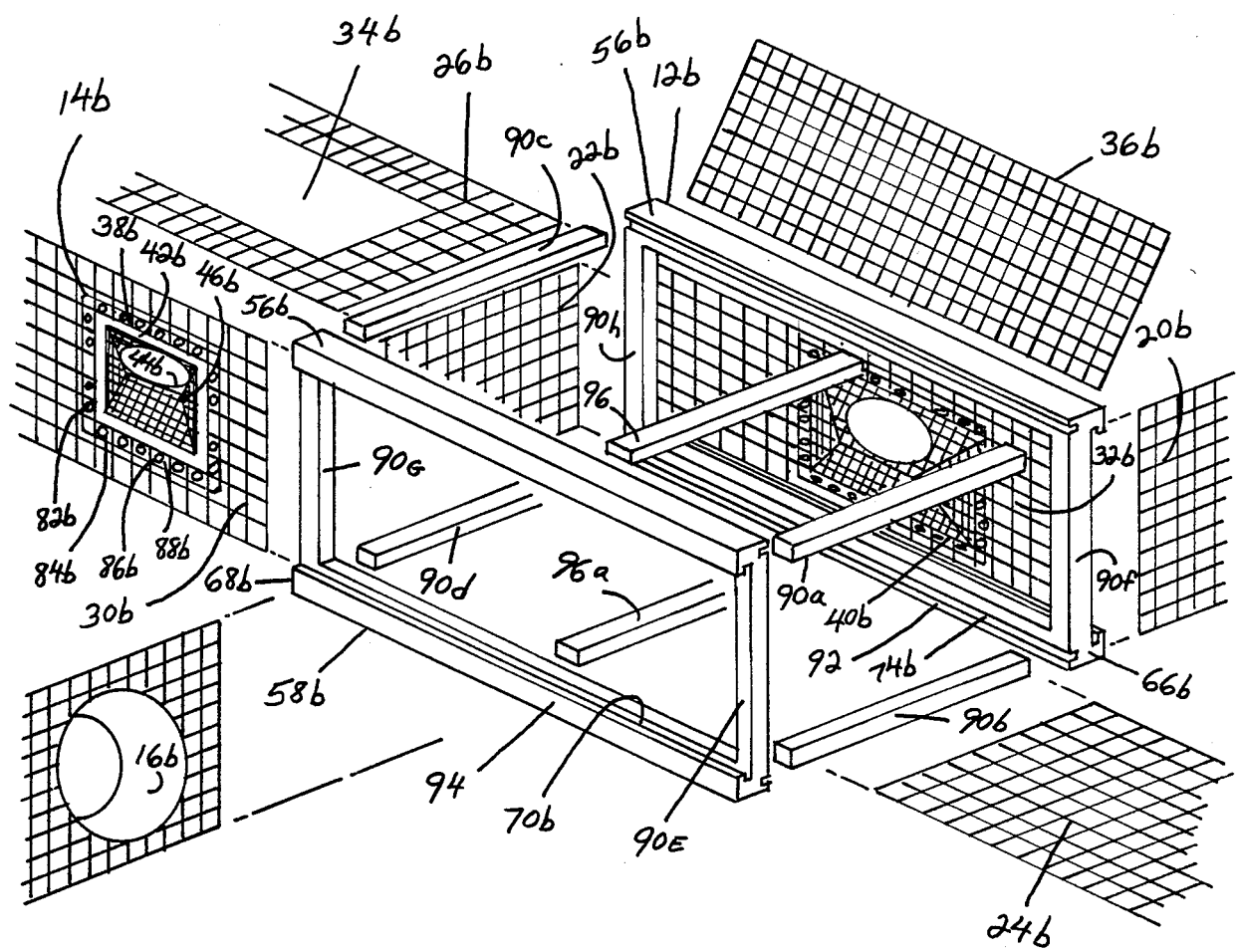
FIG. 8 is an exploded view of a second variation of the lobster pot shown in FIG. 1.
Figure 9:
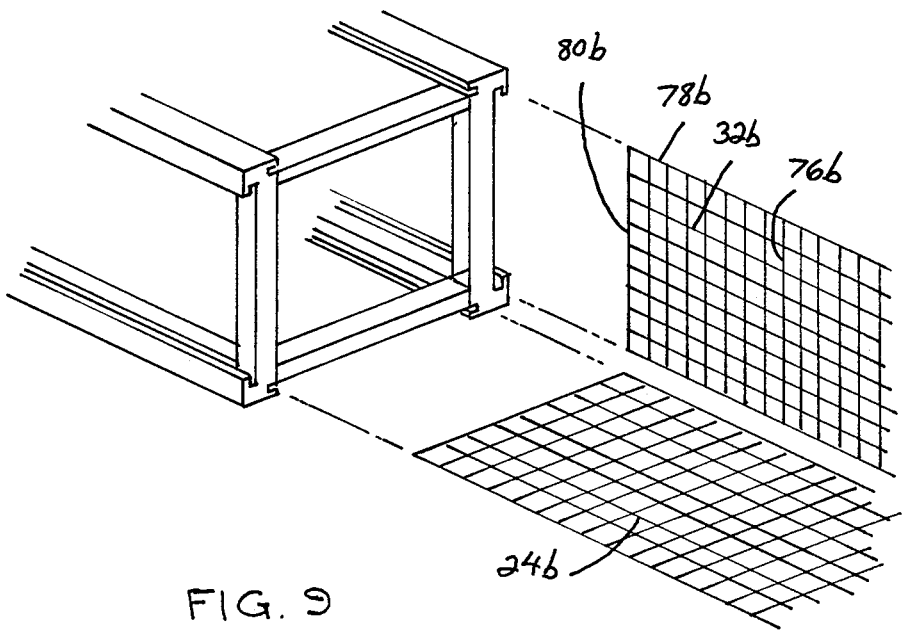
FIG. 9 is an exploded view of the second variation of the lobster pot shown in FIG. 8 and showing the frame members attached.

A second variation of the lobster pot 10 is shown in FIGS. 8 and 9 numbered as 10b and includes a housing 12b, a pair of kitchen heads 14b and a parlor head 16b.

The housing 12b is generally rectangular in configuration as are the housings 12 and 12a and includes a one piece frame formed of plastic lath members providing a pair of top channel members 56b, bottom channel members 58b, front cross bar members 90a, rear cross bar members 90b and a series of sections of wire mesh formed of fuse-bonded PVC-coated wire. Each of the channel members 56b, 58b is configured as a rectangular strip having a primary support face 92 formed on one long side, a secondary support face 94 formed on another long side in right angle relation to the first long side as shown in FIG. 8 and having a first terminal end 66b and a second terminal end 68b. Each of the secondary support face 94 has an off center positioned side mesh support channel 70b formed therein extending from the first terminal end 66b to the second terminal end 68b. Each of the primary support face 92 has a off center positioned second mesh support channel 74b formed therein extending from the first terminal end 66b to the second terminal end 68b. A first rear upright bar member 90g extends from one of the second terminal ends 68b of the top channel member 56b to the second terminal end 68b of the bottom channel member 58b over which it is superimposed and a second rear upright bar member 90h extends from the other second terminal end 68b of the top channel member 56b to the second terminal end 68b of the bottom channel member 58b over which it is superimposed positioning it in spaced parallel relation to the first rear upright bar member 90g and in right angle relation to the rear cross bar members 90c, 90d as shown in FIG. 8. A first front upright bar member 90e extends from one of the first terminal ends 66b of the top channel member 56b to the first terminal end 66b of the bottom channel member 58b over which it is superimposed and a second front upright bar member 90f extends from the other first terminal ends 66b of the top channel member 56b to the first terminal end 66b of the bottom channel member 58b over which it is superimposed positioning it in spaced parallel relation to the first front upright bar member 90e and in right angle relation to the front cross bar members 90a, 90b as shown in FIG. 8. The combination of the top channel member 56b, bottom channel member 58b, first rear upright bar member 90g and first front upright bar member 90e provides a unitary first side frame 93. The combination of the top channel member 56b, bottom channel member 58b, second rear upright bar member 90h and second front upright bar member 90f provides a unitary second side frame 95. A top cross bar 96 extends from the center of one of the top channel members 56b to the other, below the upper surfaces of the top channel members 56b and the second mesh support channels 74b. A bottom cross bar 96a extends from the center of one of the bottom channel members 58b to the other, below the upper surfaces of the bottom channel members 58b and the second mesh support channels 74b. A first front cross bar member 90a extends from one of the first terminal ends 66b of the top channel member 56b to the other and a second front cross bar member 90b extends from one of the first terminal ends 66b of the bottom channel members 58b to the other in spaced parallel relation to the first front cross bar member 90a as shown in FIG. 8. A first rear cross bar member 90c extends from one of the second terminal ends 68b of the top channel member 56b to the other and a second rear cross bar member 90d extends from one of the second terminal ends 68b of the bottom channel members 58b to the other in spaced parallel relation to the first front cross bar members 90a. Prior to forming the total frame as indicated above, the top cross bar 96, first front cross bar member 90a, second front cross bar member 90b, first rear cross bar member 90c and second rear cross bar member 90d are indvidual members having free terminal ends which are attached to the first and second side frames by an adhesive or other well known method of adherance. All of these members are formed of a plastic material. Each of the sections 76b of wire mesh is generally rectangular in configuration having long edges 78b and short edges 80b. As stated hereinabove, it is important to note that the cross section configuration of each of the channels 70b and 74b is bottle shaped. That is, it includes a narrow neck portion which opens into a bulbous portion. Since the interconnection of the wire of the sections 76b of wire mesh form nodes which are of greater diameter than the narrow necks of the said channels but are of less diameter than the bulbous portion of the said channels and since the sections 76b are cut so that a line of nodes defines the edges of the sections 76b engagement of a section 76b with a channel will position the nodes in the bulbous section and crosswires in the narrow necks.

To attach the sections of wire mesh; first position one of the long edges 78b of a first section 76b of wire mesh within one of the second mesh support channels 74b of a top channel members 56b and positioning the other one of the long edges 78b of the said section 76b of wire mesh within the second mesh support channel 74b of the other top channel member 56b forming, for example, a top side 26b; secondly position one of the long edges 78b of a second section 76b of wire mesh within one of the second mesh support channels 74b of a bottom channel members 58b and positioning the other one of the long edges 78b of the said section 76b of wire mesh within the second mesh support channel 74b of the other bottom channel member 58b forming, for example, a base side 24b; the top side 26b is superimposed in spaced relation with the base side 24b; then position one of the long edges 78b of a third section 76b of wire mesh within one of the side mesh support channels 70b of a bottom channel member 58b and positioning the other one of the long edges 78b of the said section 76b of wire mesh within the side mesh support channel 70b of the top channel member 56b aligned with the bottom channel members 58 forming, for example, a first long side 30b; then position one of the long edges 78 of a fourth section 76b of wire mesh within the remaining side mesh support channels 70b of a bottom channel members 58b and positioning the other one of the long edges 78b of the said section 76b of wire mesh within the side mesh support channel 70 of the other top channel member 56 aligned with the bottom channel members 58 forming the second long side 32b. A fifth section 76b of wire mesh can be nailed or otherwise attached to the external faces of the cross bar members 90a, 90b and to the upright bar members 90e, 90f forming a first end side 20b and a sixth section 76b of wire mesh can be nailed or otherwise attached to the external faces of the cross bar members 90c, 90d and to the upright bar members 90g, 90h forming a second end side 22b thereby providing a closed box configuration.

The housing 12b now comprises a first end side 20b, a second end side 22b, a top side 26b a base side 24b, a first long side 30b and a second long side 32b. The top side 26b has a rectangular opening 34b formed therein which may be defined by laths attached to the housing frame. A door member 36b, formed of a frame of laths having a wire mesh covering covers the opening 34b. The door member 36b is hingedly attached to the top side 26b and the opening 34b is positioned on the top side 26b so that it is superimposed over the parlor and kitchen areas. The parlor area is the area between a center plane of the housing 12b and the second end side 22b. The kitchen area is the area between the center plane of the housing 12b and the first end side 20b. A rectangular first entry opening 38b is formed in the first long side 30b at the kitchen area. A rectangular second entry opening 40b is formed in the second long side 32b at the kitchen area opposite the first entry opening 38b and in spaced relation thereto.

Each of the kitchen heads 14b is generally frustoconical in configuration, is unitary, is made of a plastic material and includes a rectangular entry collar 42b, a circular exit collar 44b and a side 46b. The entry collar 42b has a series of spaced engagement studs 82b extending from the periphery thereof. Each of the engagement studs 82b comprises a shank portion and a conical head portion 84b integral with the free terminal end of the shank. The head portion 84b defines a first shoulder 86b positioned on one side of the shank and a second shoulder 88b positioned on the other side of the shank. The entry collar 42b defines the entrance into the housing 12b and defines a larger diameter than the exit collar 44b. A kitchen head 14b is attached to the wire mesh by axially aligning it with the first entry opening 38b so that, for example, the portion of the head portion 84b defining the first shoulder 86b will bear against wires of the wire mesh causing the head portion 84b and its integral shank to flex slightly away from that wire and engaging that wire against the first shoulder 86b. There is another size of wire mesh wich will engage the second shoulder 88b in the same manner. The kitchen head 14b extends into the kitchen area with the exit defined by the exit collar 44b within the kitchen area and the circular exit, entry and first entry opening in coaxial relationship. No further attachment is required. The other kitchen head 14b is attached to second long side 32b in a similar manner. The kitchen head 14b extends into the kitchen area with the exit defined by the exit collar 44b within the kitchen area and the circular exit, entry and first entry opening in coaxial relationship.

The parlor head 16b is generally frustoconical in configuration, is unitary, is made of a plastic material and includes a rectangular entrance collar 50b, a circular egress collar 52b and a side portion 54b. The side portion 54b may be reticulated or may include a number of spaced, through apertures of any desired size and shape but not large enough to permit the passage of a grown lobster therethrough. The entrance collar 50b defines the entrance into the parlor and defines a larger diameter than the egress collar 52b. The parlor head 16b is attached to the wire mesh of the first and second long sides 30b, 32b at the center plane of the housing 12b by wiring the entrance collar 50b to the mesh of the first and second long sides 30b, 32b and the base side 24a as well as to a bar member 96. The bar member 96 is attached by adhesive or other appropriate fastening means to the top channel members 56b to lie on a plane below the top side 26b. The diameter of the entrance collar 50b is substantially equal to the area defined at the center plane of the housing 12b by the first and second long sides 30b, 32b, the base side 24b and the bar member 96. The parlor head 16b extends into the parlor area with the exit into the parlor area defined by the egress collar 52b within the parlor area and the circular entrance collar 50b and egress collar 52b in "coaxial" relationship. No further attachment is required. The lobster pot 10b may now be used in the manner well known in the art. Replacement of the heads 14b, 16b is extremely simple, due to the unitary construction and the ease of attachment.

What I claim is:

1. A lobster pot comprising a unitary plastic kitchen head, a unitary plastic parlor head and a housing, the parlor head mounted completely within the housing, the kitchen head is generally frustoconical in configuration and includes an entry collar, an exit collar and a side, the side having a first end and a second end, the exit collar integral with the first end and the entry collar integral with the second end, the parlor head is generally frustoconical in configuration and includes an entrance collar, an egress collar and a side, the side having a first end and a second end, the egress collar integral with the first end and the entrance collar integral with the second end, the housing including a plastic lath frame, a series of wire mesh sections and the kitchen head being attached to a wire mesh section, the plastic lath frames providing a pair of top channel members and a pair of bottom channel members, each of the top and bottom channel members being configured as a rectangular strip having a first support face formed on one long side and a second support face formed on another long side in right angle relation to the first long side and having a first terminal end and a second terminal end, each of the first support faces having a centrally positioned, longitudinally extending first side mesh support channel formed therein and each of the second support faces having a centrally positioned, longitudinally extending second mesh support channel formed therein whereby the sections of wire mesh are adapted to be engaged within the first and second side mesh support channels.

2. The lobster pot set forth in claim 1 wherein each of the terminal ends having a cross channel formed in spaced parallel relation to the face of the terminal end and traversing in right angle relationship the first side mesh support channel.

3. The lobster pot set forth in claim 2 wherein the series of sections of wire mesh being formed of fuse-bonded PVC-coated wire.

4. The lobster pot set forth in claim 3 wherein the cross section configuration of each of the first and second side mesh support channels includes a narrow neck portion which opens into a bulbous portion.

5. The lobster pot set forth in claim 4 wherein the wire of the sections of wire mesh are interconnected and each interconnection forms a node, the node having a greater diameter than the narrow necks of the first and second side mesh support channels but a lesser diameter than the bulbous portion of the first and second side mesh support channels and each of the sections providing a line of nodes defines the edges of the sections whereby engagement of a section with a first side mesh support channels will position the nodes in the bulbous section and wires in the narrow necks.

6. The lobster pot set forth in claim 1 wherein the plastic lath frame providing first and second top channel members, first and second bottom channel members, a first and a second front upright bar member and a first and a second rear upright bar member, the first front upright bar member extends from one of the first terminal ends of the first top channel member to the first terminal end of the first bottom channel member over which it is superimposed, the second rear upright bar member extends from one of the second terminal ends of a second top channel member to the second terminal end of a second bottom channel member over which it is superimposed and a second front upright bar member extends from one of the first terminal ends of the second top channel member to the first terminal end of the second bottom channel member over which it is superimposed, the combination of the first top channel member, first bottom channel member, first rear upright bar member and first front upright bar member being attached together providing a unitary first side frame and the combination of the second top channel member, second bottom channel member, second rear upright bar member and second front upright bar member being attached together providing a unitary second side frame, each of the first and second top and bottom channel members being configured as a rectangular strip having a first support face formed on one long side and a second support face formed on another long side in right angle relation to the first long side and having a first terminal end and a second terminal end, each of the first support faces having a centrally positioned, longitudinally extending first side mesh support channel formed therein and each of the second support faces having a centrally positioned, logitudinally extending second mesh support channel formed therein whereby the sections of wire mesh are adapted to be engaged within the first and second side mesh support channels.

* * * * *